March 26, 1940.   W. K. DANVERS   2,195,003
INSULATING BUSHING
Filed Oct. 6, 1938
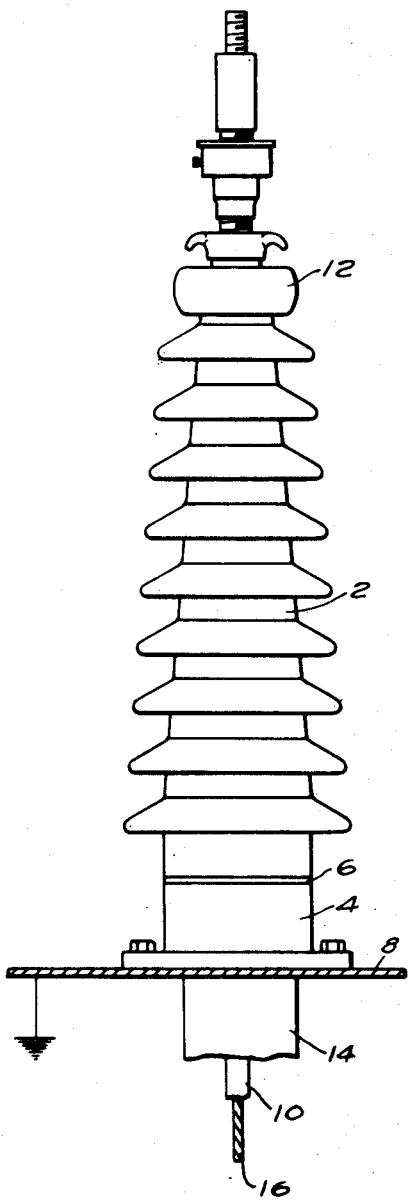
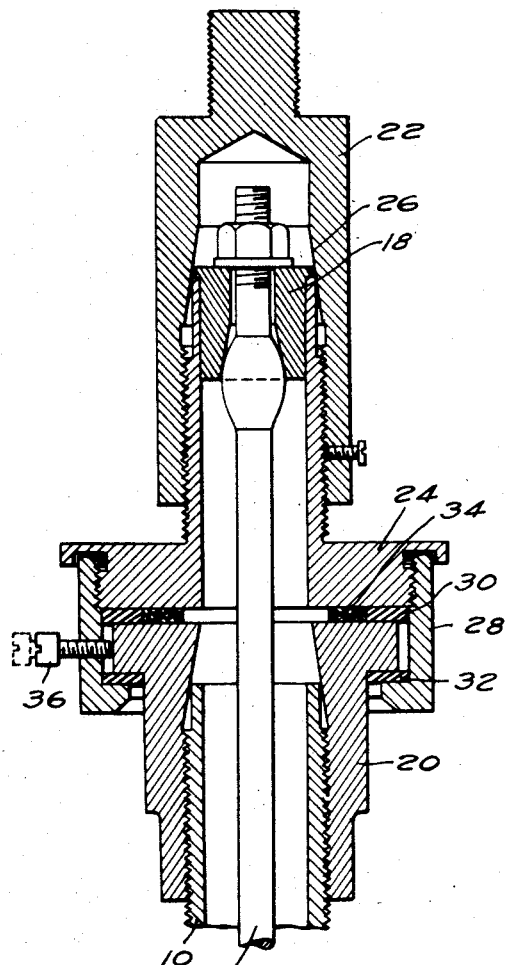
INVENTOR
William K. Danvers, Deceased
by Mary E. Danvers, Administratrix.
BY
ATTORNEY Patented Mar. 26, 1940

2,195,003

UNITED STATES PATENT OFFICE 2,195,003

INSULATING BUSHING

William K. Danvers, deceased, late of Oklahoma City, Okla., by Mary E. Danvers, administratrix, Oklahoma City, Okla., assignor to Westinghouse Electric & Manufacturing Company, East Pittsburgh, Pa., a corporation of Pennsylvania Application October 6, 1938, Serial No. 233,610

2 Claims. (Cl. 174—167)

The present invention relates to insulating bushings of the kind commonly used for insulating the leads of high-tension electrical apparatus, such as transformers and circuit breakers which are usually mounted in an oil-filled tank, and has particular reference to a bushing construction in which the terminal is particularly adapted to facilitate testing the bushing insulation.

Bushings of this general character usually comprise a porcelain weather casing through which the conductor extends, and the casing is mounted on the grounded tank which encloses the transformer or circuit breaker. One end of the bushing lead, or stud, is connected to the apparatus in the casing, and the free or exposed end terminates in a cap which closes the outer end of the porcelain casing and is provided with a terminal for attachment to an external circuit. The stud or lead within the casing is surrounded by suitable insulation, such as cylindrical shells of porcelain, or a wrapping of impregnated or coated paper, fabric or the like, or, in many cases, a wrapping of the condenser type consisting of alternate layers of metal foil and dielectric material.

There is an increased tendency to periodically test bushings of this character to determine the qualities of the insulation. This is commonly done by determining the power-factor or watts loss of the bushing insulation, and may be accomplished either by the so-called wattmeter method that is disclosed in Doble Patent No. 1,945,263, or by a bridge method which gives direct readings proportional to capacitance and power factor as disclosed in Watts et al. Patent No. 2,130,865. In practicing either method of testing, the test potential is applied to the terminal of the bushing stud and the circuit is completed through the bushing insulation to the mounting flange which is secured to the grounded tank of the circuit breaker or transformer. However, although the test potential is applied to the bushing insulation, it is also impressed upon the winding of the transformer which is connected to the bushing stud within the tank or to parts of the circuit breaker in the tank. As a result, the test readings include the losses in the bushing itself, as well as in the apparatus connected to the bushing stud. If the reading is abnormal, therefore, it cannot be determined whether the bushing is at fault or whether the high reading is caused by apparatus connected to the stud within the tank. In such event, therefore, the bushing usually would have to be disassembled from the tank on which it is mounted, and the connections with the apparatus within the tank be removed in order to isolate the bushing insulation for testing separately. This, of course, involves a substantial expenditure in time, and because of the difficulties involved, the testing is frequently neglected.

Accordingly, it is an object of the present invention to provide a bushing construction in which, by a simple manipulation, a test of the bushing may readily be made independently of any apparatus which may be connected to the bushing lead within the tank upon which the bushing is mounted.

Other objects of the invention will be apparent from the following description and from the accompanying drawing, in which:

Figure 1 is a view in elevation, with parts broken away and parts in section, of a bushing constructed in accordance with the present invention; and Fig. 2 is a view in vertical section, with parts removed, of a portion of the structure shown in Fig. 1.

Referring more particularly to the drawing, the bushing comprises, as shown in Fig. 1, a shell or weather casing 2 of dielectric material, such as porcelain, having a plurality of flanges formed integrally therewith to obtain a desired creepage surface. The casing 2 is supported upon a metallic flanged collar 4 with a suitable gasket 6 interposed therebetween, and the collar 4 is bolted, as indicated, to the cover 8 of a tank or receptacle which houses the electrical apparatus with which the bushing is to be associated.

A tubular stud 10 extends axially through the casing 2 and terminates above a metallic cap 12 of bowl-shape of the character disclosed in Patent No. 2,078,219 to Burr et al. It is to be understood, of course, that the cap 12 may be of various shapes and constructions, the form shown being merely by way of example.

The stud 10 is surrounded by any suitable insulating medium, and in the present example it is provided with a wrapping 14 of the condenser type, which is merely indicated in the lower portion of Fig. 1 and is sufficiently well known in the art to avoid the necessity for further illustration or description. In a preferred embodiment, the wrapping 14 is sufficiently thick that it is received in the collar 4 with a press fit forming a fluid-tight joint with the collar. The space in the casing 2 surrounding the wrapping 14 is preferably filled with an insulating gum or oil in accordance with usual practice.

The conducting lead 16 from the apparatus within the tank 8 is fished-up through the tubular stud 10, and, as indicated in Fig. 2, is suitably bolted in position by means of a fitting 18 in a terminal extension formed on the end of the stud 10.

The terminal extension comprises a flanged head 20 threaded on the extremity of the tubular stud, and, as indicated in Fig. 2, by reason of the inner tapered bore of the head, a wedged fluid-tight joint is provided between the stud and the head portion.

Similarly, the terminal 22 is interiorly threaded for receiving a flanged member 24 therein, into the top of which is placed the fitting 18 to which the end of the lead 16 is clamped. Here again the bore of the terminal 22 is tapered at 26 to effect an oil-tight wedged fit with the upper end of the member 24.

The head 20 and member 24 are so formed that, in conjunction with a clamping nut 28, they constitute a joint similar to a pipe union.

With the construction thus far described, if it is desired to test the power factor or measure the insulating loss in the bushing in accordance with usual practice, the test voltage would be applied to the terminal 22, but as above indicated, the voltage would then be impressed both on the bushing insulation and on apparatus connected to the conducting lead 16.

In order to avoid this difficulty, it is contemplated that the parts of the union 20, 24 and 28 shall be so insulated from each other that the terminal 22 will be electrically isolated from the tubular stud 10. This may be accomplished by providing insulating gaskets 30 and 32 on the two faces of the flange of the head member 20, substantially as shown in Fig. 2. Further, since it is desired that the terminal and stud assembly shall be relatively rigid, the insulating gaskets 30 and 32 are preferably of a hard dielectric material, such as a molded phenolic condensation product formed under heat and pressure into a relatively hard body of high mechanical strength. In view of the relative hardness of the gasket 30, it is desirable to provide a second gasket 34 concentric with it of a relatively softer and more resilient material to maintain a fluid-tight joint at this point. With this construction, if the test potential is applied directly to the stud 10 or to the head portion 20, it will not be impressed upon the conducting lead 16, and accordingly the insulation of the bushing between the stud 10 and ground may be accurately tested. At the same time, the terminal of the conducting lead 16 being electrically connected directly to the terminal 22, the operation of the bushing will not be affected by reason of the insulating washers 30, 32 and 34.

However, in normal operation of the bushing, it is desirable that the terminal 22, with the lead 16 connected to it, should be at the same electrical potential as the tubular stud 10, and this may be accomplished, by way of example, by means of a set screw 36 threaded through the clamping nut 28 to normally engage the edge of the flange on the head portion 20. Now when it is desired to test the bushing, the screw 36 may be backed off to the dotted line position and out of contact with the head portion 20, and the test potential applied to the head 20 or the stud 10. The screw 36 thereby constitutes a releasable electrical connection between the terminal 22 and the stud and may readily be manipulated to break such connection when a test of the bushing is desired.

Quite obviously modifications may be made in the construction shown without departing from the spirit of the invention, and it is intended that the invention shall not be limited except by the scope of the appended claims.

What is claimed is:

1. In a bushing for high-tension electrical apparatus, a hollow stud of conducting material having a conductor extending therethrough and insulated therefrom, a tubular fitting having an outwardly extending circular flange secured to one end of said stud, a second tubular fitting having an outwardly projecting flange confronting said first-mentioned flange, insulating means separating said confronting flanges, a clamping collar interiorly threaded to an edge of one of said flanges and having an inwardly extending portion overlying the rear face of the other of said flanges, insulation separating said portion and said rear face, means for electrically connecting an end of said conductor interiorly of said second tubular fitting, and releasable means for electrically connecting said tubular fittings to maintain them at the same electrical potential.

2. In a bushing for high-tension electrical apparatus, a hollow stud of conducting material having a conductor extending therethrough and insulated therefrom, a tubular fitting having an outwardly extending circular flange secured to one end of said stud, a second tubular fitting having an outwardly projecting flange confronting said first-mentioned flange, insulating means separating said confronting flanges, a clamping collar interiorly threaded to an edge of one of said flanges and having an inwardly extending portion overlying the rear face of the other of said flanges, insulation separating said portion and said rear face, means for electrically connecting an end of said conductor interiorly of said second tubular fitting, and releasable means for electrically connecting said tubular fittings to maintain them at the same electrical potential comprising a screw extending through the side wall of said collar into engagement with the flange to which the collar is not threaded.

MARY E. DANVERS,
*Administratrix of the Estate of William K. Danvers, Deceased.*